US012145796B1

(12) United States Patent
Perez Aleman

(10) Patent No.: US 12,145,796 B1
(45) Date of Patent: Nov. 19, 2024

(54) MODIFIED AND CUSTOMIZABLE TRASH AND RECYCLING RECEPTACLE

(71) Applicant: Armando Perez Aleman, Miami, FL (US)

(72) Inventor: Armando Perez Aleman, Miami, FL (US)

( * ) Notice: Subject to any disclaimer, the term of this patent is extended or adjusted under 35 U.S.C. 154(b) by 0 days.

(21) Appl. No.: 18/665,483

(22) Filed: May 15, 2024

Related U.S. Application Data

(63) Continuation of application No. 18/196,892, filed on May 12, 2023.

(51) Int. Cl.
*B65F 1/14* (2006.01)
*B65F 1/16* (2006.01)

(52) U.S. Cl.
CPC .............. *B65F 1/1473* (2013.01); *B65F 1/16* (2013.01)

(58) Field of Classification Search
CPC ........ B65F 1/1473; B65F 1/16; B65F 1/1623; B65D 19/42; B65D 2501/24987; B65D 43/26; B65D 83/262; B65D 88/43; B65D 2313/04
See application file for complete search history.

(56) References Cited

U.S. PATENT DOCUMENTS

D260,753 S * 9/1981 Partain .............................. D34/5
4,765,503 A * 8/1988 Otto ........................ B65F 1/122 414/408
4,953,744 A * 9/1990 Koyama ................... B65F 1/06 220/495.11
5,103,994 A * 4/1992 Doxey ................... B65D 45/20 220/908
5,167,351 A * 12/1992 Prout .................... B65F 1/1468 220/908
5,251,780 A * 10/1993 Lee ....................... B65F 1/1468 D34/5
5,465,844 A * 11/1995 Lee ....................... B65F 1/1473 220/908
5,511,807 A * 4/1996 Snyder ...................... B65F 1/16 220/908
5,538,158 A * 7/1996 Prout ...................... B29C 41/06 220/675
8,096,565 B2 * 1/2012 Meers ....................... B65F 1/02 220/908
8,424,714 B2 * 4/2013 Kruse ..................... B65F 1/122 220/756

(Continued)

*Primary Examiner* — Kareen K Thomas
(74) *Attorney, Agent, or Firm* — Calrie Marsh, P.A.; Calrie Marsh, Esq.

(57) ABSTRACT

The present invention provides various configurations of the bin and lid portions of waste receptacles for ease of use by residential users, while remaining adaptable to different methods of trash collection and/or waste collection vehicles. The present invention inverts or rearranges the location of the wheels, handlebar, and hinge(s) of the lid from the rear of the bin to the front of the bin; or rearranges the location of the hinge(s) to change the point of attachment of the lid to the bin. The present invention also includes prefabricated lid apparatus for attachment to existing bins via a fastening means or secure mode of connection. The combination of the inverted bin components, and/or rearrangement of the location of the lid hinge(s), and/or the customized lid apparatus result in a new, improved and useful garbage and/or recycling receptacle.

9 Claims, 12 Drawing Sheets

(56) References Cited

U.S. PATENT DOCUMENTS

| | | | | |
|---|---|---|---|---|
| 9,903,141 | B2 * | 2/2018 | Foster | E05B 65/006 |
| 9,975,694 | B1 * | 5/2018 | Foster | B65F 1/16 |
| 11,254,497 | B2 * | 2/2022 | Nolet | B65F 1/1452 |
| 2004/0206759 | A1 * | 10/2004 | Busch | B65F 1/1615 220/908 |
| 2006/0191949 | A1 * | 8/2006 | Miller | B65F 1/141 220/908 |
| 2017/0174427 | A1 * | 6/2017 | Wagner | B65F 1/1468 |
| 2018/0134486 | A1 * | 5/2018 | Parker | B65F 1/1623 |
| 2021/0114806 | A1 * | 4/2021 | Murray | B65F 1/1468 |
| 2021/0307576 | A1 * | 10/2021 | Brinson, III | A47L 13/52 |

* cited by examiner

MODIFIED AND CUSTOMIZABLE TRASH AND RECYCLING RECEPTACLE

STATEMENT REGARDING FEDERALLY SPONSORED RESEARCH OR DEVELOPMENT

This invention has been created without the sponsorship or funding of any federally sponsored research or development program.

FIELD OF INVENTION

The present invention relates generally to garbage and recycling receptacles and specifically to modified garbage and recycling receptacles with a customized lid apparatus.

BACKGROUND

Garbage and/or recycling bins for residential use are designed with the wheels, handlebar, and the hinge of the lid/cover are all located in the same plane of the receptacle. With this existing design, a user must move the receptacle to and from the curb, pushing or pulling it from behind. This design makes it difficult, cumbersome, and awkward for residential users to maneuver the bin during use. The existing bin makes it even more difficult, cumbersome, and awkward for a residential user to move the bin about when it is full or heavy and/or when depositing trash or recycling items into the bin, whether the bin is moving or stationary. The residential user has to walk around to the front of the bin in order to raise or remove the lid and access the bin for depositing trash or recycling items, and then turn the bin to move it to the collection point. This poses a problem not only for the average residential user, but also more significantly for the elderly, the frail, or the otherwise physically challenged residential user.

The present invention addresses these issues by rearranging or relocating the wheels, handlebar, and the lid hinge position in different vertical planes; or rearranging or relocating the lid hinge position; or adding a customized lid apparatus to facilitate improved handling and maneuvering of the garbage and/or recycling bin by a residential user, including the elderly, the frail, or the otherwise physically challenged.

SUMMARY OF INVENTION

The present invention provides a solution to the problem posed by the existing design and configuration of residential garbage and/or recycling bins. The present invention rearranges or relocates the wheels, handlebar, and/or the lid hinge position, or adds a customized lid apparatus that eliminates the need to walk to the front of the bin or turn the bin around, in order to open the lid for depositing additional trash or recycling items, and/or maneuvering the bin when it is full or heavy. The present invention also provides a modified garbage or recycling receptacle to address the problem of a residential user having to turn the bin around in order to move it from one location to another, such as from the storage area to the curbside or vice versa, especially when the bin is heavy or full. The combination of the modified receptacle, repositioned lid hinge, or the customized lid apparatus facilitates improved handling and maneuvering by a residential user, including the elderly, the frail, or the otherwise physically challenged.

The present invention is an improvement of existing garbage and/or recycling bins whereby the location of the wheels, handlebar, and hinge of the lid are inverted or rearranged in different vertical planes in comparison to that of existing bins. The present invention may be referred to as BINVERT by virtue of inverting the location of various components. The present invention also provides various configurations for the lid portion of existing bins to eliminate the awkwardness of the existing bin lids. These various configurations of the lid portion of existing bins make it adaptable to different methods of trash collection and/or waste collection vehicles. The present invention rearranges the location of the wheels, handlebar, and/or hinge of the lid in different vertical planes; or rearranges the location of the hinge(s) to change the point of attachment of the lid to the bin. The present invention also provides for the manufacturing of a lid apparatus for attachment to existing bins via a fastening means or secure mode of connection. The combination of the inverted or rearranged bin components, and/or location of the lid hinge, and/or the customized lid apparatus result in a new, improved and useful garbage and/or recycling receptacle.

In one embodiment of the present invention, the new lid apparatus includes pre-drilled holes and holes drilled by a residential user into the existing bin, which holes are aligned with each other and secured by a fastener. In this embodiment, the fastener may comprise a series of "easy push plastic pins" inserted into each aligned hole, locking the new lid into place onto the existing bin. In other embodiments of the present invention, a new lid apparatus may include a prefabricated pin or clip that is used to secure the lid apparatus to the existing bin; or the new lid apparatus may include latches that hook onto the existing bin to secure the lid apparatus to the existing bin. These various configurations of the lid apparatus result in a secure and durable attachment of the new lid to the existing trash bin, thus facilitating better handling and maneuvering of the residential garbage or recycling receptacle.

DESCRIPTION OF THE INVENTION

Before the subject invention is described further, it is to be understood that the invention is not limited to the embodiments of the invention described below, as variations of the particular embodiments may be made and still fall within the scope of the invention. It is also to be understood that the terminology employed is for the purpose of describing particular embodiments and is not intended to be limiting.

The details of one or more embodiments of the invention are set forth in the accompanying drawings and the description below. Other features, objects, and advantages of the invention will be apparent from the description and drawings, and from the claims. In the following description, numerous specific details are set forth to provide a thorough understanding of the embodiments. One skilled in the art to which this invention belongs will recognize, however, that the techniques described can be practiced without one or more of the specific details, or with other methods, components, materials, etc. In other instances, well known structures, materials, or operations are not shown or described in detail to avoid obscuring certain aspects.

In this specification, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

The present invention, in its various embodiments, is adaptable for use with a variety of waste collection vehicles. Waste collection vehicles come in many designs, but the more commonly utilized are the rear loader and the side loader varieties. The rear loaders have an opening into a trough or hopper at the rear into which a waste collector manually empties the contents of a trash bin or waste receptacle. The waste material is compacted or crushed inside the hopper by a hydraulic powered mechanism. Some rear loaders have one or more mechanical lift apparatus whereby the waste collector positions the trash receptacle on the lift apparatus which then mechanically empties the contents of the receptacle into the hopper for compacting. Conversely, side loaders utilize a motorized or mechanical arm that wraps around the body of a waste receptacle and empties it into the waste collection vehicle. This does not require a waste collector to handle the trash receptacle, but rather the driver or other operator of the waste collection vehicle is able to control the motorized or mechanical arm using a controller or joystick or remote control means. Without being limiting, some embodiments of the present the present invention may be more suited for use with rear loaders, whereas other embodiments of the present invention may be more suitable for use with side loaders.

Figure 1:
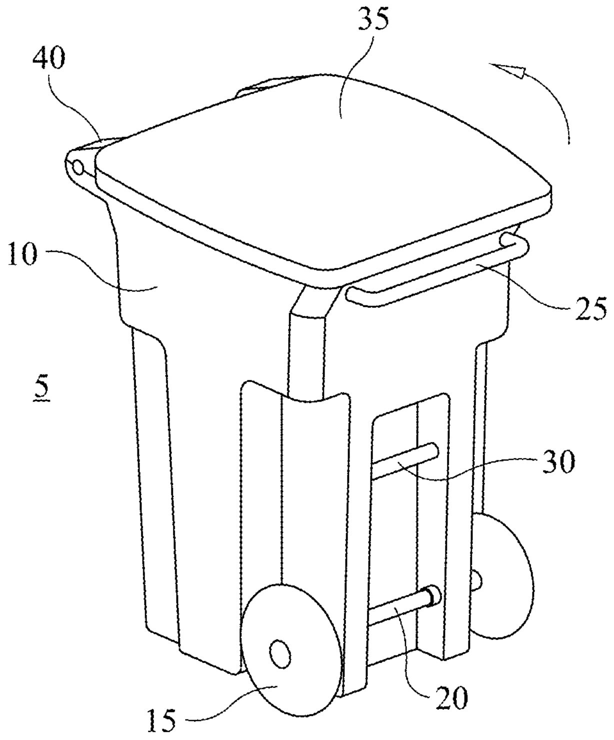
FIG. 1 is a top perspective view of one embodiment of the present invention illustrating wheels, handlebar, and lid hinge(s) located in different vertical planes of a receptacle.
Figure 2:
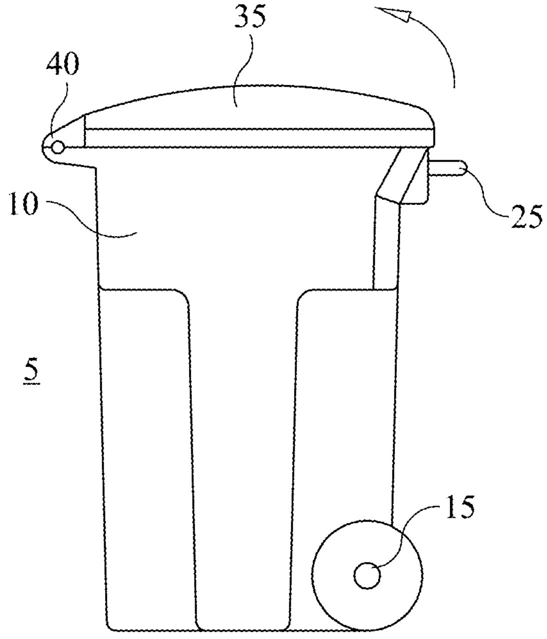
FIG. 2 is a side view of the embodiment of the present invention illustrating wheels, handlebar, and lid hinge(s) located in different vertical planes of the receptacle.
Figure 3:
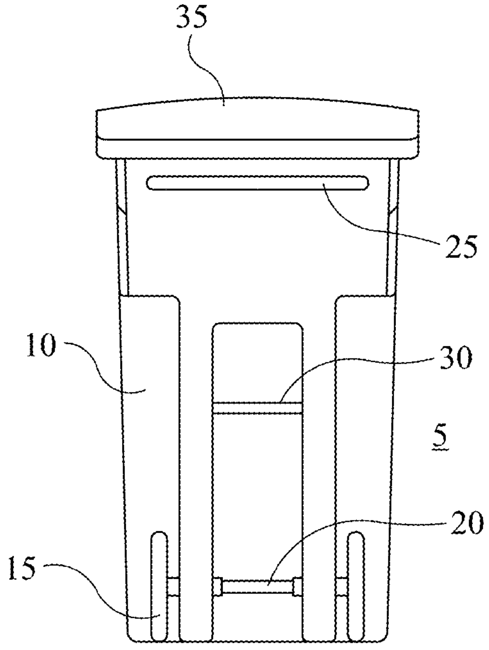
FIG. 3 is a front view of the embodiment of the present invention illustrating wheels, handlebar, and lid hinge(s) located in different vertical planes of a receptacle.
Figure 4:
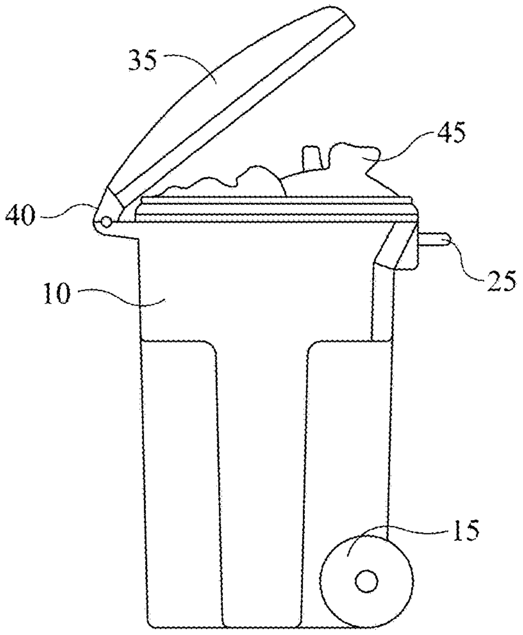
FIG. 4 is a side perspective view of the embodiment of the present invention illustrating wheels, handlebar, and lid hinge(s) located in different vertical planes of the receptacle with a partially opened lid and the receptacle is filled with waste.
Figure 5:
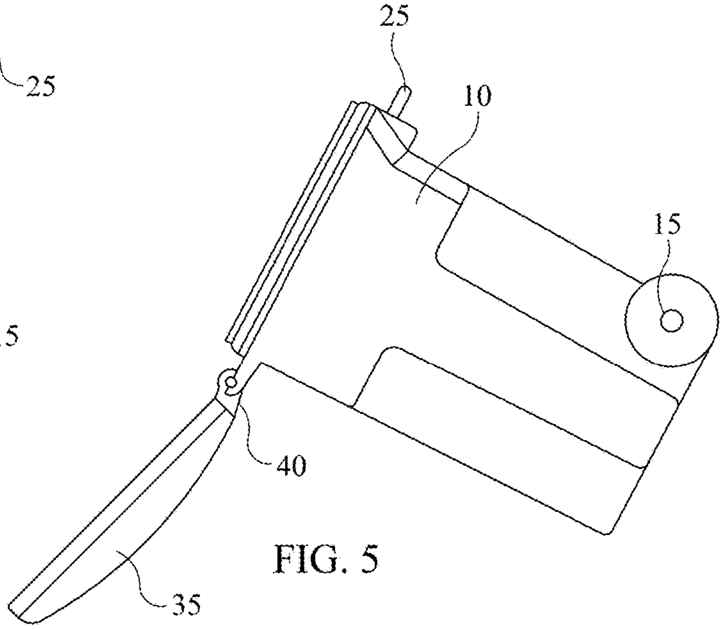
FIG. 5 is a side perspective view of the embodiment of the present invention illustrating wheels, handlebar, and lid hinge(s) inverted to the front of a tilted receptacle with a partially opened lid.
Figure 6:
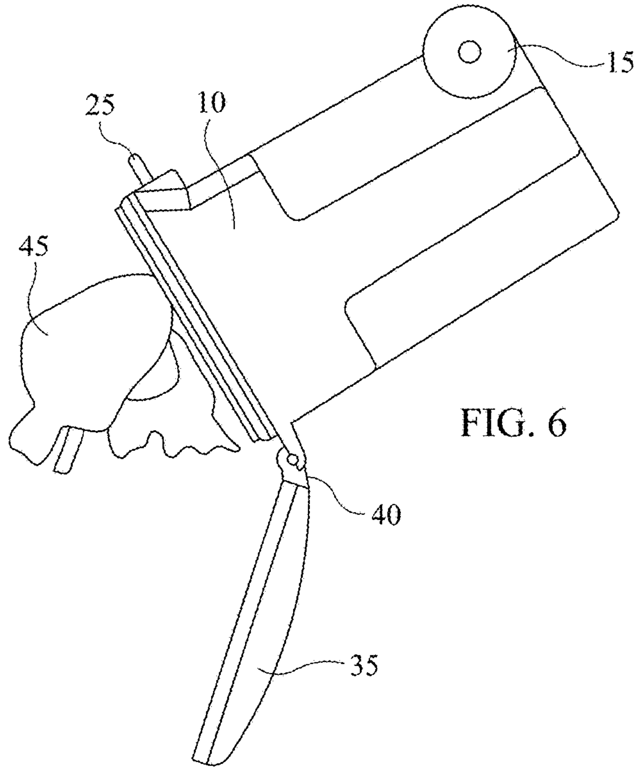
FIG. 6 is a side perspective view of the embodiment of the present invention illustrating wheels, handlebar, and lid hinge(s) located in different vertical planes of a tilted receptacle with an opened lid releasing garbage.

The present invention is an improvement on a residential garbage and/or recycling receptacle 5, as shown in FIG. 1, comprising a hollow bin 10 portion including two wheels 15 connected by an axle 20 at the bottom of the bin, a handlebar 25 located near the top of the bin 10, a crossbar 30 located about the middle of the bin 10, a lid 35 located on the top of the bin 10, and lid hinges 40 that attach the lid 35 to the bin 10 of the receptacle 5. In FIG. 1, the handlebar 25, the two wheels 15 adjacently attached to each other at the bottom of the bin 10 by the axle 20, and the crossbar 30 are all located in the same vertical plane or as depicted at the front of the receptacle 5. As shown in FIG. 1, in this first embodiment of the invention the wheels 15 and the handlebar are located in the same vertical plane or as depicted at the front of the bin 10 portion of the receptacle 5, and the lid hinges 40 are located in the opposite vertical plane in relation to the wheels and handlebar 25 of the bin 10 portion of the receptacle 5. This configuration positions the hinges 40 symmetrically parallel to and opposite from the handlebar 25. This configuration facilitates or allows for the opening of the lid 35 while a user is moving the receptacle 5 using the handlebar 25. This configuration, lid hinges 40 opposite the handlebar 25, is also illustrated in FIG. 2 and FIG. 3 from the side and front perspective, respectively. As shown in FIGS. 4, 5, and 6, the lid hinges 40 opposite the handlebar 25 configuration of the present invention does not hinder the depositing of trash 45 or other items into the receptacle 5 while the user is moving the receptacle 5 nor does it interfere with the normal process for the collection of trash 45 by a waste collection vehicle. The position of the hinges 40 allows for the unobstructed opening of the lid 35 by a user and is more suitable for use with a side loader waste collection vehicle. Further, the user is able to effortlessly maneuver the receptacle from one location to another location, such as from the storage area to the curbside or vice versa. With this configuration, the lid 35 opens from the front to the back of the receptacle 5 as depicted or the lid 35 opens away from the wheels 15 and the handlebar 25. The location of the hinges 20 in relation to handlebar 25 allows a user to maneuver the bin, regardless of whether it is being opened by a person or a waste collection vehicle.

Figure 7:
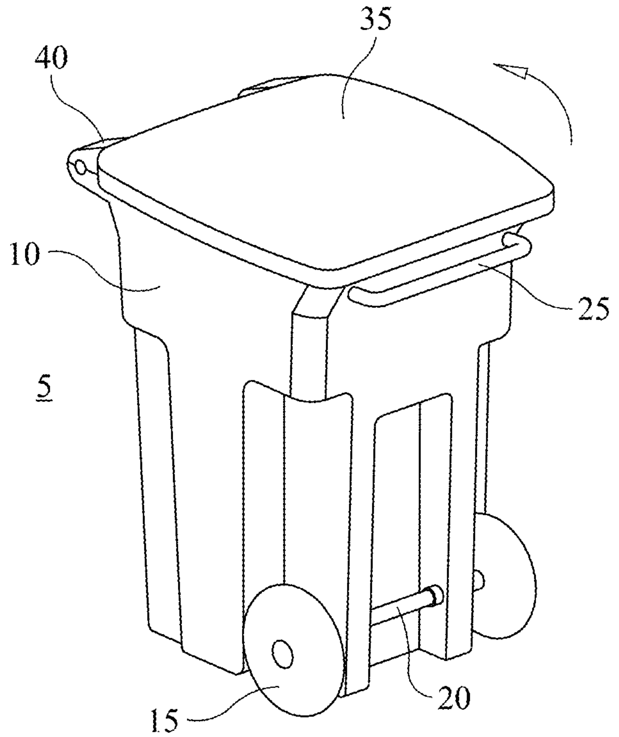
FIG. 7 is a top perspective view of one embodiment of the present invention illustrating lid hinge(s) located to a vertical plane opposite to the vertical plane of the wheels and handlebar of a receptacle.
Figure 8:
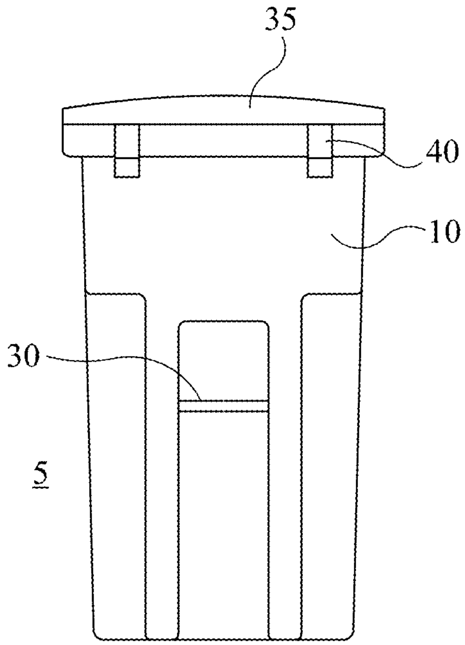
FIG. 8 is a front perspective view of the embodiment of the present invention illustrating the lid hinge(s) is relocated to a vertical plane opposite to the vertical plane of the wheels and handlebar of the receptacle.
Figure 9:
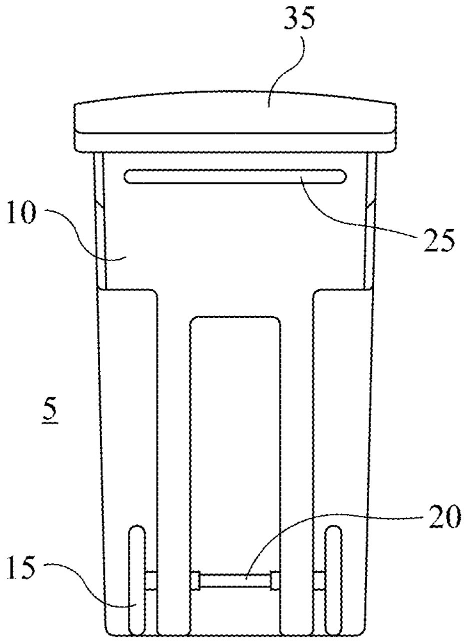
FIG. 9 is a rear perspective view of the embodiment of the present invention illustrating the lid hinge(s) is relocated to a vertical plane opposite to the vertical plane of the wheels and handlebar of the receptacle.
Figure 10:
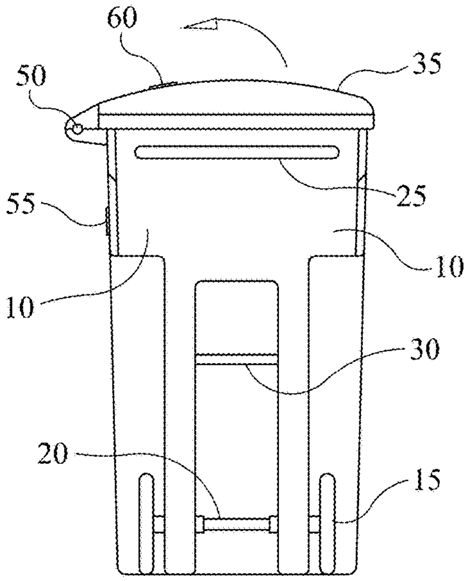
FIG. 10 is a front perspective view of another embodiment of the present invention illustrating lid hinge(s) is relocated to a perpendicular plane left adjacent to the vertical plane of the wheels and handlebar, and includes a magnetic latch mechanism.

In a second embodiment of the present invention, the location of the wheels 15 and handlebar 25 are located in the same vertical plane or in the rear of the receptable 5 as depicted. The crossbar 30 and lid hinges 40 are located in the same vertical plane and opposite the wheels and handlebar 25 as shown in FIG. 7 through and including FIG. 9. As shown in FIG. 7, in this embodiment of the invention the residential garbage and/or recycling receptacle 5 comprises the bin 10 portion of the receptacle 5, the handlebar portion 25 of the bin 10, the lid portion 35 of the receptacle 5, two wheels 15 adjacently attached to each other at the base of the bin 10 by an axle 20, and lid hinges 40 or connection point for the bin 10 and the lid 35. As shown in FIGS. 7 and 9, the wheels 15 and the handlebar 25 are located in the same plane or to the rear of the bin 10 portion of the receptacle 5 as depicted. As shown in FIG. 8, the lid hinges 40 and the crossbar 30 are located in the same vertical plane or as depicted at the front of the bin 10 portion of the receptacle 5, opposite from the vertical plane of the handlebar 25 of the receptacle 5. This configuration facilitates the opening of the lid 35 while a user is moving the receptacle 5 using the handlebar 25. As shown in FIGS. 7, 8, and 9, the lid 35 is positioned to open from the from the back to the front of the bin 10 or to open away from the handlebar 25 as depicted. This configuration does not hinder the depositing of trash 45 or other items into the receptacle 5 while the user is moving the receptacle 5 nor does it interfere with the normal process for the collection of trash 45 by a waste collection vehicle. The location of the lid hinges 40 in relation to the handlebar 25, allows for the unobstructed opening of the lid 35 by a user and similarly by a waste collection vehicle. Further, the user is able to effortlessly maneuver the receptacle from one location to another location, such as from a storage area to the curbside or vice versa without having to turn the bin around to maneuver or to deposit trash.

Figure 11:
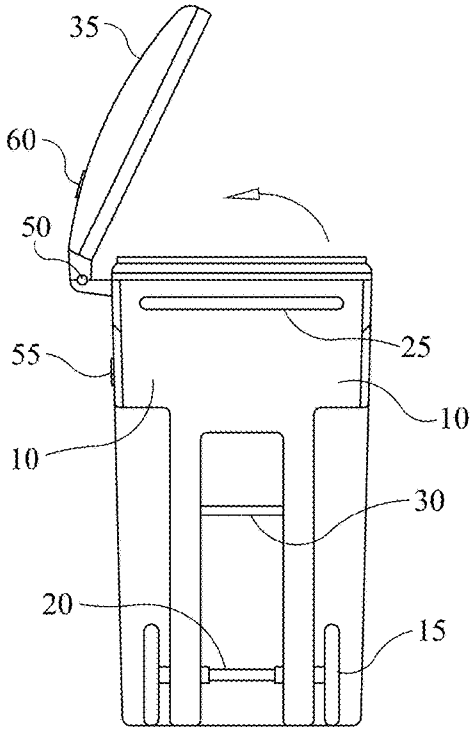
FIG. 11 is a front perspective view of the embodiment of the present invention illustrating the lid hinge(s) is relocated to a perpendicular plane left adjacent to the vertical plane of the wheels and handlebar, including a magnetic latch mechanism, and a partially opened lid.
Figure 12:
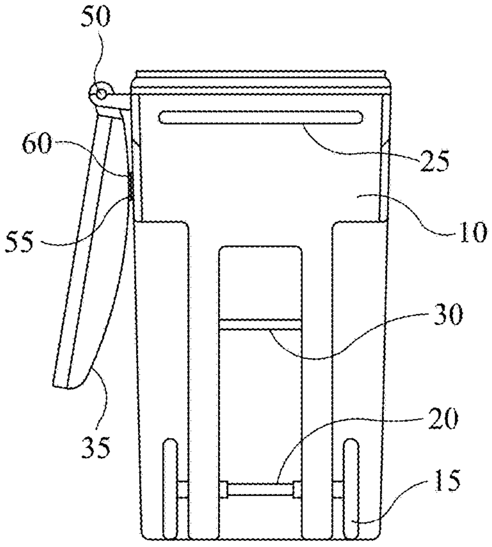
FIG. 12 is a front perspective view of the embodiment of the present invention illustrating the lid hinge(s) is relocated to a perpendicular plane left adjacent to the vertical plane of the wheels and handlebar, including a magnetic latch mechanism, and a completely opened lid secured by the magnetic latch mechanism.
Figure 13:
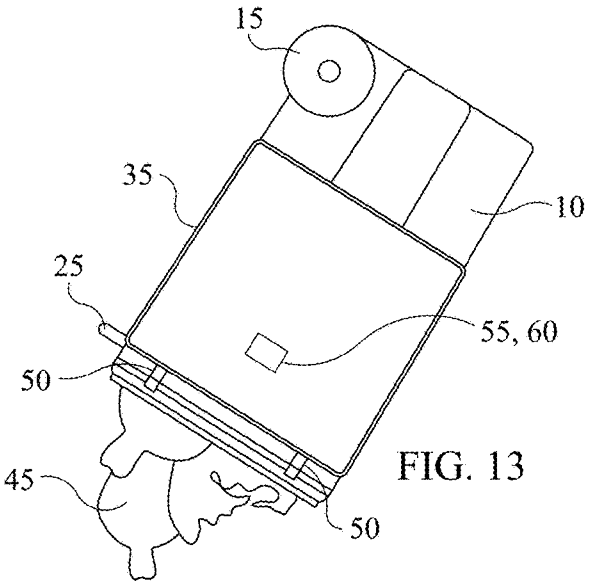
FIG. 13 is a side perspective view of the embodiment of the present invention illustrating the lid hinge(s) is relocated to a perpendicular plane left adjacent to the vertical plane of the wheels and handlebar, including a magnetic latch mechanism, and a completely opened lid secured by the magnetic latch mechanism allowing for the release of waste.
Figure 14:
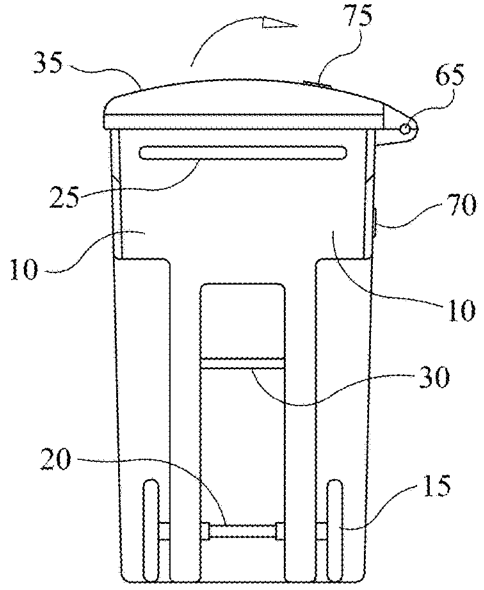
FIG. 14 is a front perspective view of another embodiment of the present invention illustrating the lid hinge(s) is relocated to a perpendicular plane right adjacent to the vertical plane of the wheels and handlebar, including a magnetic latch mechanism, and a completely closed lid.

FIGS. 10, 11, 12, and 13 illustrate a third embodiment of the invention wherein the wheels 15, handlebar 25, and the crossbar 30 are located in the same vertical plane of the bin 10 portion of the receptacle 5, while the lid hinges 50 are located in a vertical plane of the bin 10 portion of the receptacle 5 that is perpendicularly adjacent to the handlebar 25. In this configuration, the hinges 50 connect the lid 35 to the bin 10 and the hinges are perpendicularly left adjacent to the handlebar 25. This configuration facilitates the opening of the lid 35 while a user is moving the receptacle 5 from one location to another. The lid hinges 50 located to the left and perpendicularly adjacent to the handlebar 25, may include two magnets 55, 60, one attached to the bin 10, referred to as the bin magnet 55; and a second magnet that is attached to the lid 35, referred to as the lid magnet 60. FIGS. 11, 12 and 13 illustrate the function of the magnets 55, 60 which is to secure the opened lid 35 to the bin 10 during the trash 45 removal or collection process. The magnets 55, 60 allow for the maneuvering of the receptacle 5 without the lid 35 of the bin 10 flailing about or obstructing the trash 45 collection process, in particular when carried manually by a waste collector who deposits the waste into the rear part of the waste collection vehicle.

This configuration of the present invention, lid hinges 50 positioned to the left and perpendicularly adjacent to the handlebar 25 with a bin magnet 55 and a lid magnet 60, does not hinder the depositing of trash or other items into the receptacle 5 while the user is moving, nor does it interfere with the normal process for the collection of trash by a waste collection vehicle. The position of the hinges 50 allows for the unobstructed opening of the lid 35 by a user and similarly by a waste collection vehicle. In addition, the position of the hinges 50 in combination with the placement of the two magnets 55, 60 allows for the unobstructed opening of the lid 35 by a waste collection vehicle. This embodiment of the invention is suitable for use with a side loader or a rear loader waste collection vehicle in particular when carried out manually by a waste collector who deposits the waste into the rear part of the waste collection vehicle. With this configuration, the lid 35 opens from the right to the left of the receptacle 5 or away from the opposing side of the bin as depicted, regardless of whether it is being opened by a person or a waste collection vehicle.

Figure 15:
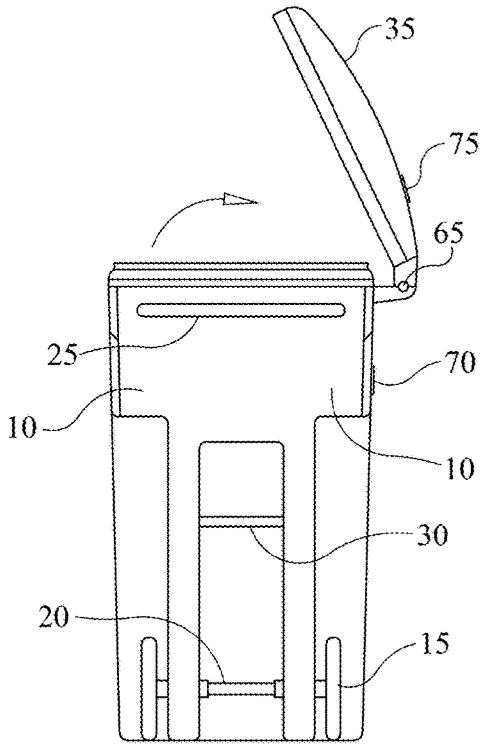
FIG. 15 is a front perspective view of the embodiment of the present invention illustrating the lid hinge(s) is relocated to a perpendicular plane right adjacent to the vertical plane of the wheels and handlebar, including a magnetic latch mechanism, and a partially opened lid.
Figure 16:
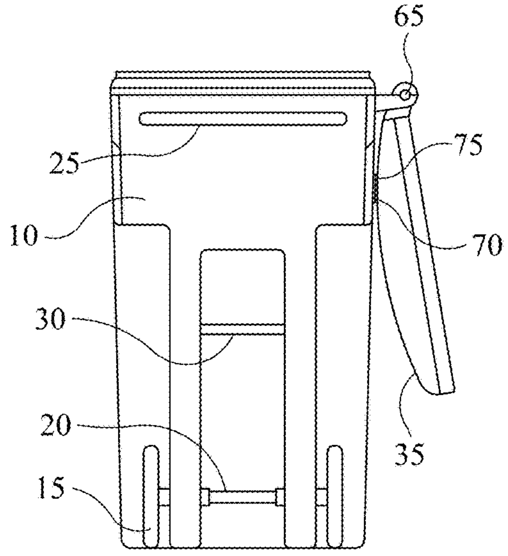
FIG. 16 is a front perspective view of the embodiment of the present invention illustrating the lid hinge(s) is relocated to a perpendicular plane right adjacent to the vertical plane of the wheels and handlebar, including a magnetic latch mechanism, and a completely opened lid secured by the magnetic latch mechanism.
Figure 17:
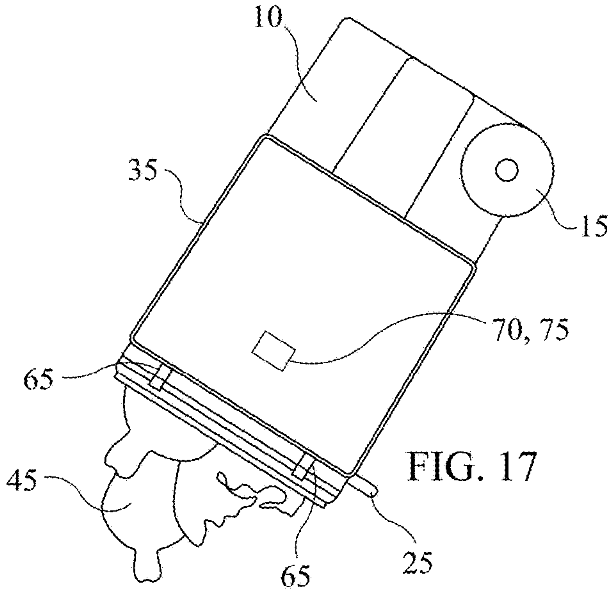
FIG. 17 is a side perspective view of the embodiment of the present invention illustrating the lid hinge(s) is relocated to a perpendicular plane left adjacent to the vertical plane of the wheels and handlebar, including a magnetic latch mechanism, and a completely opened lid secured by the magnetic latch mechanism allowing for the release of garbage.

FIGS. 14, 15, 16, and 17, illustrate a fourth embodiment of the present invention wherein the wheels 15, handlebar 25, and the crossbar 30 are located in the same vertical plane of the bin 10 portion of the receptacle 5, however lid hinges 65 are located in a vertical plane of the bin 10 portion of the receptacle 5 that is perpendicularly adjacent to the handlebar 25. In this configuration, the lid hinges 65 connect the lid 35 to the bin 10 and the hinges 65 are perpendicularly right adjacent to the handlebar 25; and facilitates the opening of the lid 35 while a user is moving the receptacle 5. This configuration, lid hinges 65 positioned to the right and perpendicularly adjacent to the handlebar 25, includes two magnets 70, 75, one is attached to the bin 10, referred to as the bin magnet 70; and a second is attached to the lid 35, referred to as the lid magnet 75. FIGS. 15, 16 and 17 illustrate the utility of the bin magnet 70 and the lid magnet 75 which is to secure the opened lid 35 to the bin 10 during the trash 45 removal or collection process. The magnets 70, 75 allow for the maneuvering of the receptacle 5 without the lid 35 flailing about or obstructing the trash 45 collection process, particularly when the process is carried out by a waste collection vehicle. This embodiment of the invention is compatible for use with a side loader or a rear loader waste collection vehicle. With this configuration, the lid 35 opens from the left to the right side of the receptacle 5 by virtue of the position of the lid hinges 65 regardless of whether it is being opened by a person or a waste collection vehicle.

This configuration of the present invention, lid 35 positioned to the right and perpendicularly adjacent to the handlebar 25 with a bin magnet 70 and a lid magnet 75, does not hinder the depositing of trash or other items into the receptacle 5 while the user is moving, nor does it interfere with the normal process for the collection of trash by a waste collection vehicle. The lid hinges 65 position and the placement of the magnets 70, 75 allow for the unobstructed opening of the lid 35 by a user and waste collection by a waste collection vehicle. This embodiment of the invention is compatible for use with a side loader or a rear loader waste collection vehicle.

The configuration of lid hinges and the addition of bin and lid magnets as described above for the third and fourth embodiments, may also apply to the second embodiment of the present invention (not depicted). The second embodiment as shown in FIGS. 7, 8, and 9 retains the conventional location of wheels 15, handlebar 25, and crossbar 30 of the receptacle 5, i.e., the wheels 15 and the handlebar 25 are located in the same vertical plane of the bin 10 and the crossbar is located in the opposite vertical plane to the wheels 15 and handlebar 25. However, the second embodiment may also include lid hinges 40 located perpendicularly right adjacent to handlebar 25 (as described for the fourth embodiment) or perpendicularly left adjacent to the handlebar 25 (as described for the third embodiment); and/or may also include bin magnets and lid magnets. Although not depicted, these additional configurations and components to the second embodiment of this invention would function in the same manner as described for the third and fourth embodiments herein.

Figure 18:
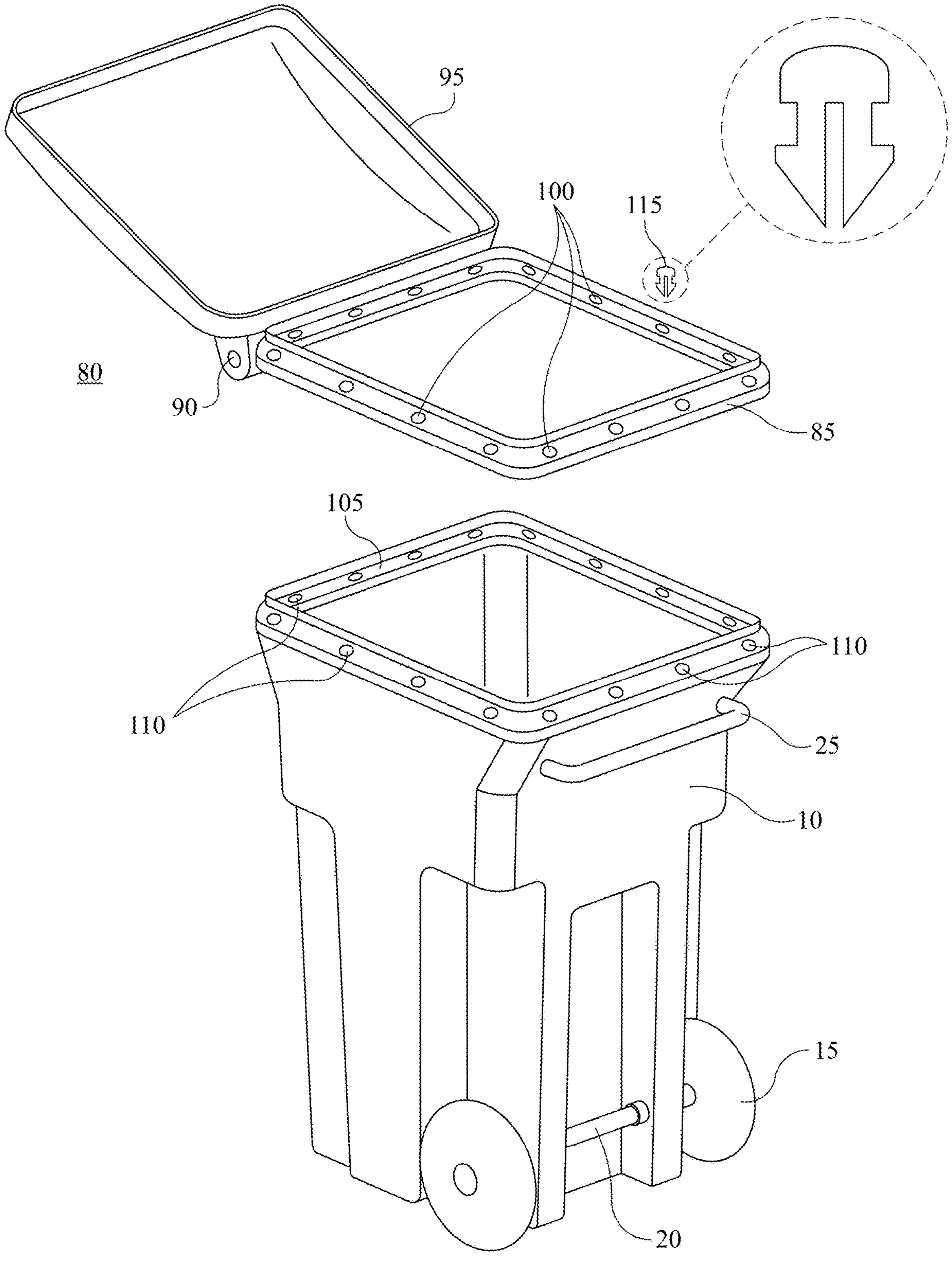
FIG. 18 is a top perspective view of another embodiment of the present invention, with a separate prefabricated lid apparatus having a push pin fastening means that attaches the lid hinge in a vertical plane of the receptacle opposite the vertical plane of the wheels and handlebar of the receptacle.
Figure 19:
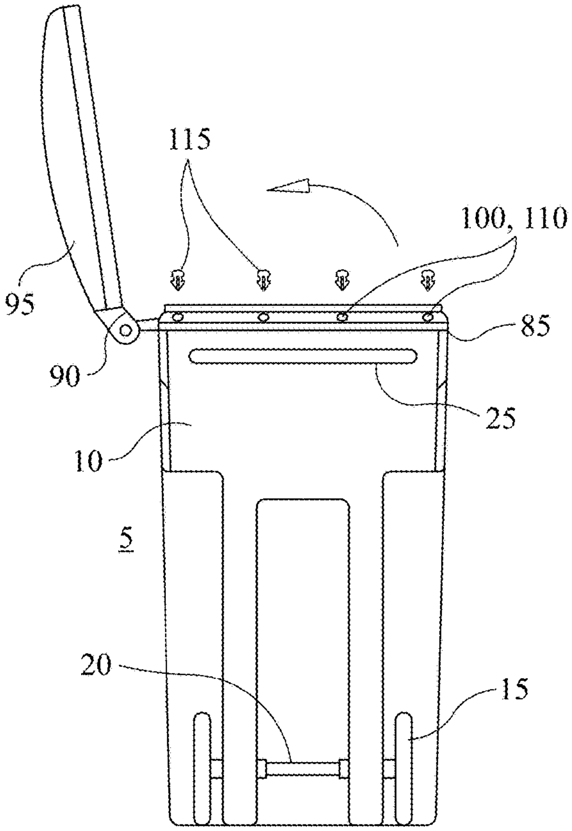
FIG. 19 is a back perspective view of the embodiment of the present invention with a separate lid apparatus having a push pin fastening means that is partially attached to the bin portion of a receptacle whereby the lid hinge is attached in a perpendicular plane left adjacent to the wheels and handlebar of the receptacle.
Figure 20:
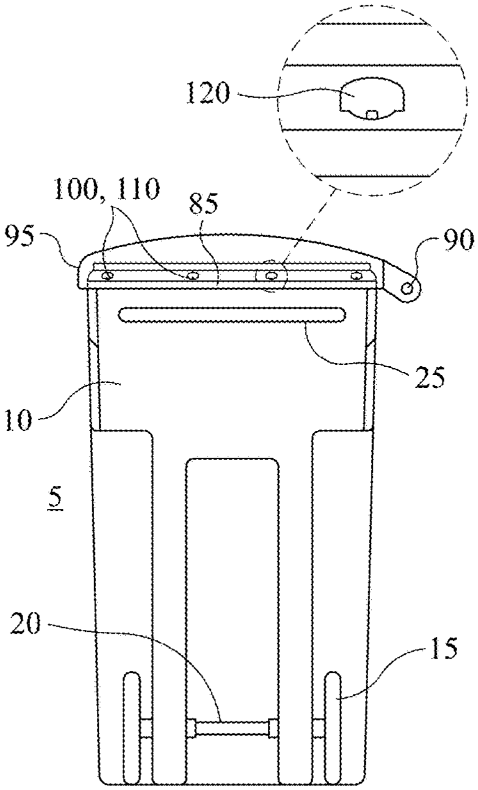
FIG. 20 is a back perspective view of the embodiment of the present invention with a separate lid apparatus having a push pin fastening means that is completely attached to the bin portion of a receptacle whereby the lid hinge is attached the wheels and handlebar of the receptacle.

In a fifth embodiment of the present invention, the receptacle 5 comprises customized components, namely a prefabricated lid apparatus 80 as shown in FIG. 18. The prefabricated lid apparatus 80 is separate from and attachable to the bin 10 portion of the receptacle 5 as shown in FIGS. 18, 19, and 20. As shown in FIG. 18, the lid apparatus 80 comprises a lower perimeter portion 85, a lid hinge 90 that connects the lower perimeter portion 85 to a lid 95, and small holes 100 positioned equidistant about the lower perimeter portion 85 of the lid apparatus 80. The bin portion of the receptacle 5 also has customized features, namely the lower perimeter portion 85 of the lid apparatus 80 corresponds to a customized top perimeter portion 105 of the bin 10. The top perimeter portion 105 of the bin 10 includes small holes 110 positioned equidistant about the top perimeter portion 105 of the bin 10 which correspond to the small holes 100 positioned equidistant about the lower perimeter portion 85 of the lid apparatus 80. The dimensions of the top perimeter portion 105 of the bin 10 mirror that of the lower perimeter portion 85 of the lid apparatus 80, except that the measurement of the lower perimeter portion 85 of the lid apparatus 80 is sufficiently larger or slightly larger than the top perimeter portion 105 of the bin 10 to ensure a tight fit when the lid apparatus 80 is attached over the top perimeter portion 105 of the bin 10 to form a customized receptacle 5 as shown in FIGS. 19 and 20. The minimal difference in the measurement of the respective perimeters 85, 105 ensures a tight fit void of any gaps or observable spacing between the lid apparatus 80 and the top perimeter portion 105 of the bin 10. The measurement of this minimal difference is known to one of ordinary skill in the art of making trash and recycling receptacles.

As shown in FIGS. 18, 19, and 20, the lower perimeter portion 85 of the lid apparatus 80 is attached to the top perimeter portion 105 of the bin 10 whereby the corresponding small holes 100, 110 are aligned, and the lower perimeter portion 85 and top perimeter portion 105 are securely fastened together by a fastener 115 which is positioned through the aligned small holes 100, 110. In this fifth embodiment of the present invention, the fastener 115 is a flexible two-pronged push pin device 115, as shown in FIGS. 18 and 19. As shown in FIG. 19, the flexible two-pronged push pin device 115 is inserted into and through the aligned small holes 100, 110 whereby the prongs are squeezed together, contracting to allow passage through the small holes 100, 110 and are sufficiently flexible to expand or return to their original shape or position once pushed through the small holes 100, 110, snapping into place to securely fasten the lower perimeter portion 85 to the top perimeter portion 105, as illustrated in the magnified view 120 of FIG. 20. The resulting receptacle 5 is customized whereby the lid apparatus 80 is attached to the bin 10, and whereby the lid hinge 90 is located in a vertical plane opposite to the wheels 15 and handlebar 25, both of which are located in the same vertical plane of the bin 10 as shown in FIG. 18. This allows the lid 95 to be opened away from the wheels 15 and handlebar 25 of the receptacle 5 without obstruction. Alternatively, as shown in FIG. 19, the lid hinge 90 is attached to the bin 10 and is located perpendicularly left adjacent to the wheels 15 and handlebar 25. This allows the lid 95 to be opened from the right to the left (as depicted) of the receptacle 5 without obstruction. Alternatively, as shown in FIG. 20, the hinge 90 is attached to the bin 10, and is located perpendicularly right adjacent to the wheels 15 and handlebar 25. This allows the lid 95 to be opened from the left to the right (as depicted) of the receptacle 5 without obstruction. In other configurations, the bin 10 and lid 95 of the lid apparatus may include a bin magnet and a lid magnet (not depicted) to secure the opened lid 95 to the bin 10 during the garbage and/or recycling removal process, particularly when carried out by a waste collection vehicle. This embodiment of the invention is suitable for use with a side loader or a rear loader waste collection vehicle.

The embodiment of the present invention, as shown in FIGS. 18, 19, and 20, utilizes a conventional receptacle without rearranging or inverting the location of the wheels and handlebar from their original location (i.e., opposite vertical plane, perpendicularly right or left). Further, the lid portion of a conventional receptacle is removed in order to attach the lid apparatus 80 to the bin 10, and the top perimeter portion 105 of the bin 10 is modified by a user drilling matching holes 110 around the top perimeter portion 105, which holes 110 align with the prefabricated holes 100 on the lower perimeter portion 85 of the lid apparatus 80. These modifications are easy to make and can be done by any residential user. On the other hand, the lid apparatus 80 and its components are prefabricated as one contiguous member or pre-assembled members which does/do not require further modification by a user.

Figure 21:
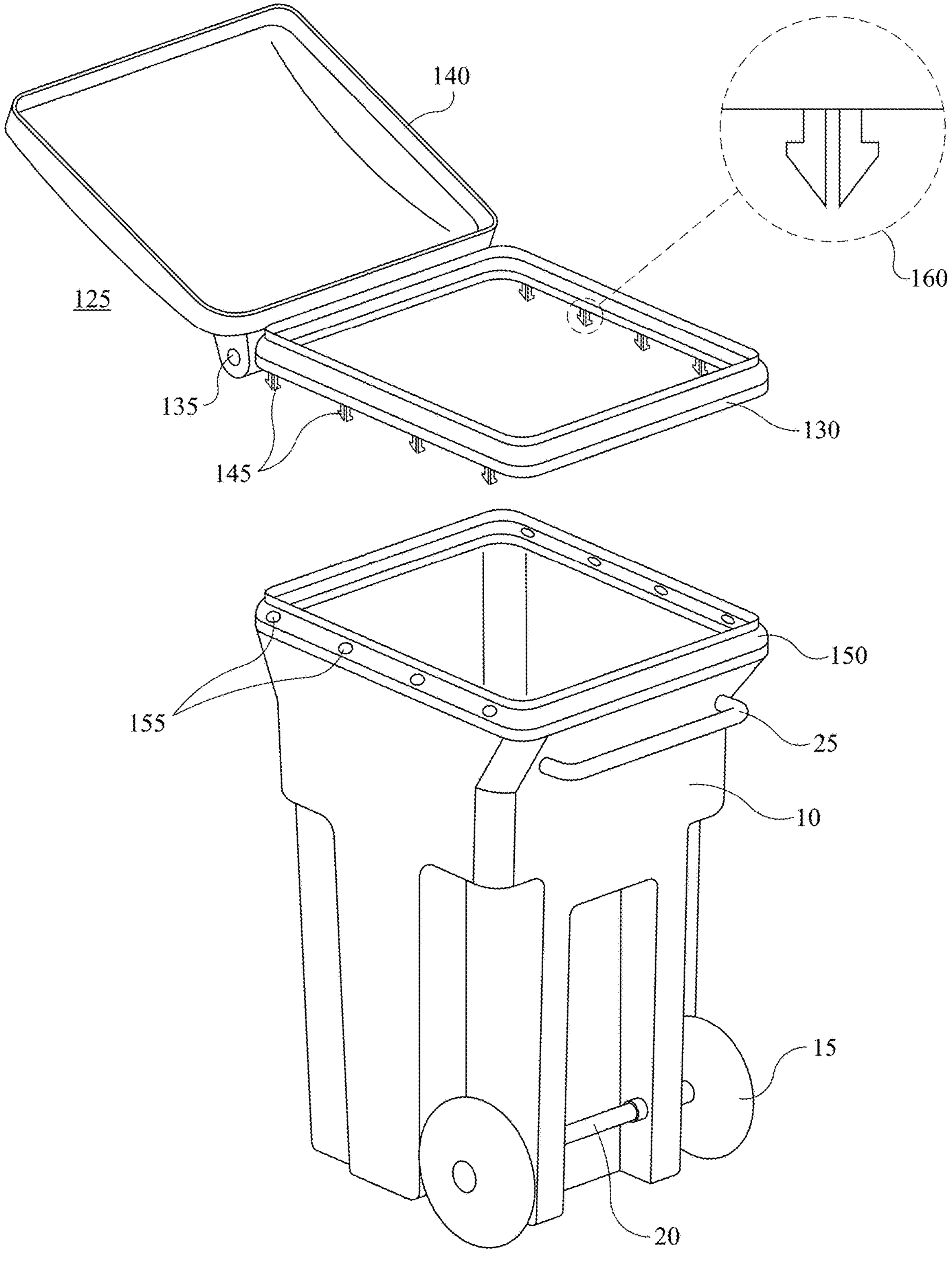
FIG. 21 is a top rear perspective view of another embodiment of the present invention with a separate prefabricated lid apparatus having a pin fastening means that attaches the lid hinge in a vertical plane opposite to the vertical plane of the wheels and handlebar of the receptacle.
Figure 22:
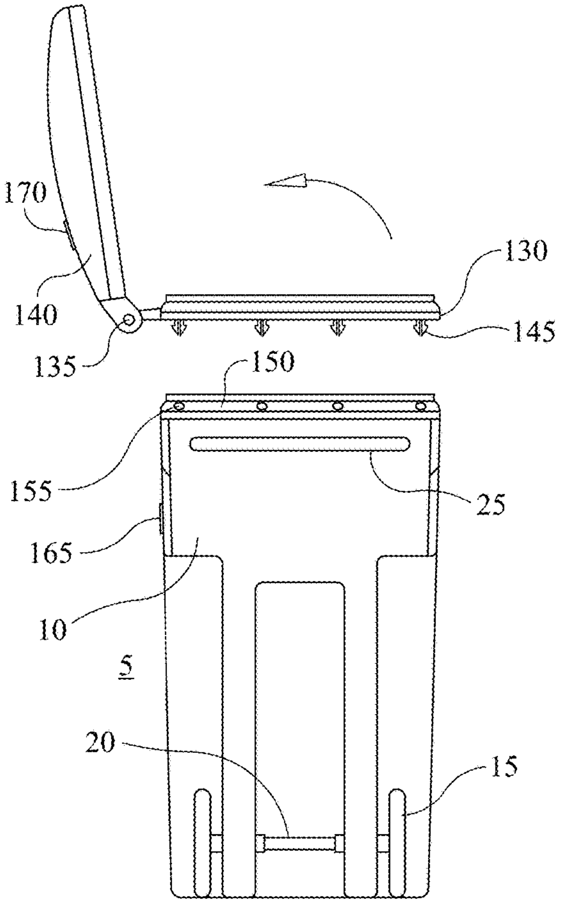
FIG. 22 is a rear perspective view of another embodiment of the present invention with a separate prefabricated lid apparatus having a prefabricated pin fastening means that attaches the lid hinge in a perpendicular plane left adjacent to the wheels and handlebar of the receptacle.
Figure 23:
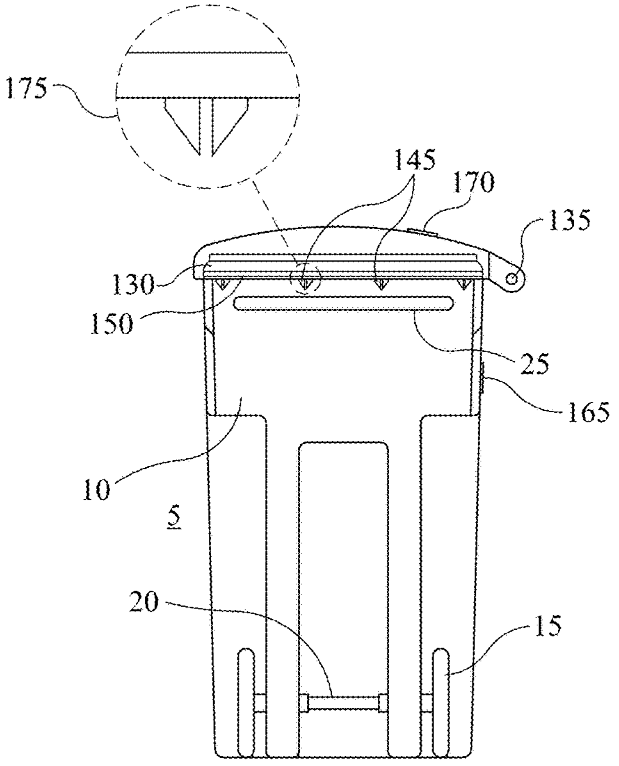
FIG. 23 is a rear perspective view of the embodiment of the present invention with a separate prefabricated lid apparatus having a pin fastening means that attaches the lid hinge in a perpendicular plane right adjacent to the wheels and handlebar of the receptacle.

In a sixth embodiment of the present invention, the receptacle 5 comprises customized components, namely a prefabricated lid apparatus 125 as shown in FIG. 21. The lid apparatus 125 is separate from and attachable to the bin 10 portion of the receptacle 5. As shown in FIG. 21, the lid apparatus 125 comprises a lower perimeter portion 130; a hinge 135 that connects the lower perimeter portion 130 to a lid 140; and prefabricated fastening devices 145 that are affixed to the underside of the lower perimeter portion 130 of the lid apparatus 125. As shown in FIG. 21, the bin 10 portion of the receptacle 5 is customized whereby the top perimeter portion 150 of the bin includes small holes 155 positioned equidistant along two parallel opposing sides of the top perimeter portion 150 of the bin 10 which correspond to the position of the prefabricated fastening devices 145 about the lower perimeter portion 130 of the lid apparatus 125. In this sixth embodiment of the present invention, the fastening devices 145 comprise flexible two-pronged pin or c devices that are prefabricated as part of the lid apparatus 125 and extend from the underside of the lower perimeter portion 130 of the lid apparatus 125, as illustrated in the magnified view 160 of FIG. 21. The dimensions of the top perimeter portion 150 of the bin 10 mirror that of the lower perimeter portion 130 of the lid apparatus 125, except that the measurement of the lower perimeter portion 130 of the lid apparatus 125 is sufficiently larger or slightly larger than the top perimeter portion 150 of the bin 10 to ensure a tight fit when the lid apparatus 125 is attached over the top perimeter portion 150 of the bin 10 to form a customized receptacle 5 as shown in FIGS. 22 and 23. The minimal difference in the measurement of the respective perimeters 130, 150 ensures a tight fit void of any gaps or observable spacing between the lid apparatus 125 and the top perimeter portion 150 of the bin 10. The measurement of this minimal difference is known to one of ordinary skill in the art of making trash and recycling receptacles.

As shown in FIGS. 21 and 22, the top perimeter portion 130 of the lid apparatus 125 is attached to the top perimeter portion 150 of the bin 10 whereby the flexible two-pronged pins or cs 145 are aligned above the corresponding small holes 155 made along the top perimeter portion 150 and then are inserted into and through the small holes 155. To assemble the lid apparatus 125 to the bin 10, the two prongs of each fastening device 145 are squeezed together, contracting to allow passage through the small holes 155 and are sufficiently flexible to expand or return to their original position once pushed through the small holes 155, snapping into place to securely fasten the lower perimeter portion 130 to the top perimeter portion 150, as illustrated in the magnified view 175 of FIG. 23. The resulting receptacle 5 is customized whereby the hinge 135 of the lid apparatus 125 is located in a vertical plane opposite that of the wheels 15 and handlebar 25, which are both located in the same vertical plane of the bin 10, as shown in FIG. 21. This allows the lid 140 to be opened from the back to the front (as depicted) of the receptacle without obstruction. Alternatively, as shown in FIG. 22 the hinge 135 of the lid apparatus 125 is attached to the bin 10, and is located perpendicularly left adjacent to the wheels 15 and handlebar which are located in the same plane of the bin 10. This allows the lid 140 to be opened from the right to the left (as depicted) of the receptacle 5 without obstruction. Alternatively, as shown in FIG. 23 the hinge 135 of the lid apparatus 135 is attached to the bin 10, and is located perpendicularly right adjacent to the wheels 25 and handlebar 15, which are both located in the same vertical plane of the bin 10. This allows the lid 140 to be opened from the left to the right (as depicted) of the receptacle 5 without obstruction. In other configurations, the bin 10 and lid 140 may include a bin magnet 165 and a lid magnet 170, as shown in FIGS. 22 and 23, to secure the opened lid 140 to the bin 10 during the garbage and/or recycling removal process, particularly when carried out by a waste collection vehicle. This embodiment of the invention is suitable for use with a side loader or a rear loader waste collection vehicle.

The embodiment of the present invention, as shown in FIGS. 21, 22, and 23, utilizes a conventional receptacle without rearranging or inverting the position of the wheels and handlebar from their original location, (i.e., at the rear of the conventional receptacle). Further, the lid portion of a conventional receptacle is removed in order to attach the lid apparatus 125 to the bin 10, and the top perimeter portion 150 of the bin 10 is modified by a user by drilling holes 155 on parallel opposing sides of the top perimeter portion 150 of the bin 10. The holes 155 align with the prefabricated fastening devices 145 affixed to the underside of the lower perimeter portion 130 of the lid apparatus 125. Alternatively, the flexible two-pronged pin or c devices 145 may be prefabricated along the front and rear of the lower perimeter portion 130 of the lid apparatus 125 and therefore corresponding holes 155 would be made along the front and rear of the top perimeter portion 150 of the bin 10 (not depicted). These modifications are easy to make and can be done by any residential user. On the other hand, the lid apparatus 125 and its components are prefabricated as one contiguous member which do not require further modification by a user.

Figure 24:
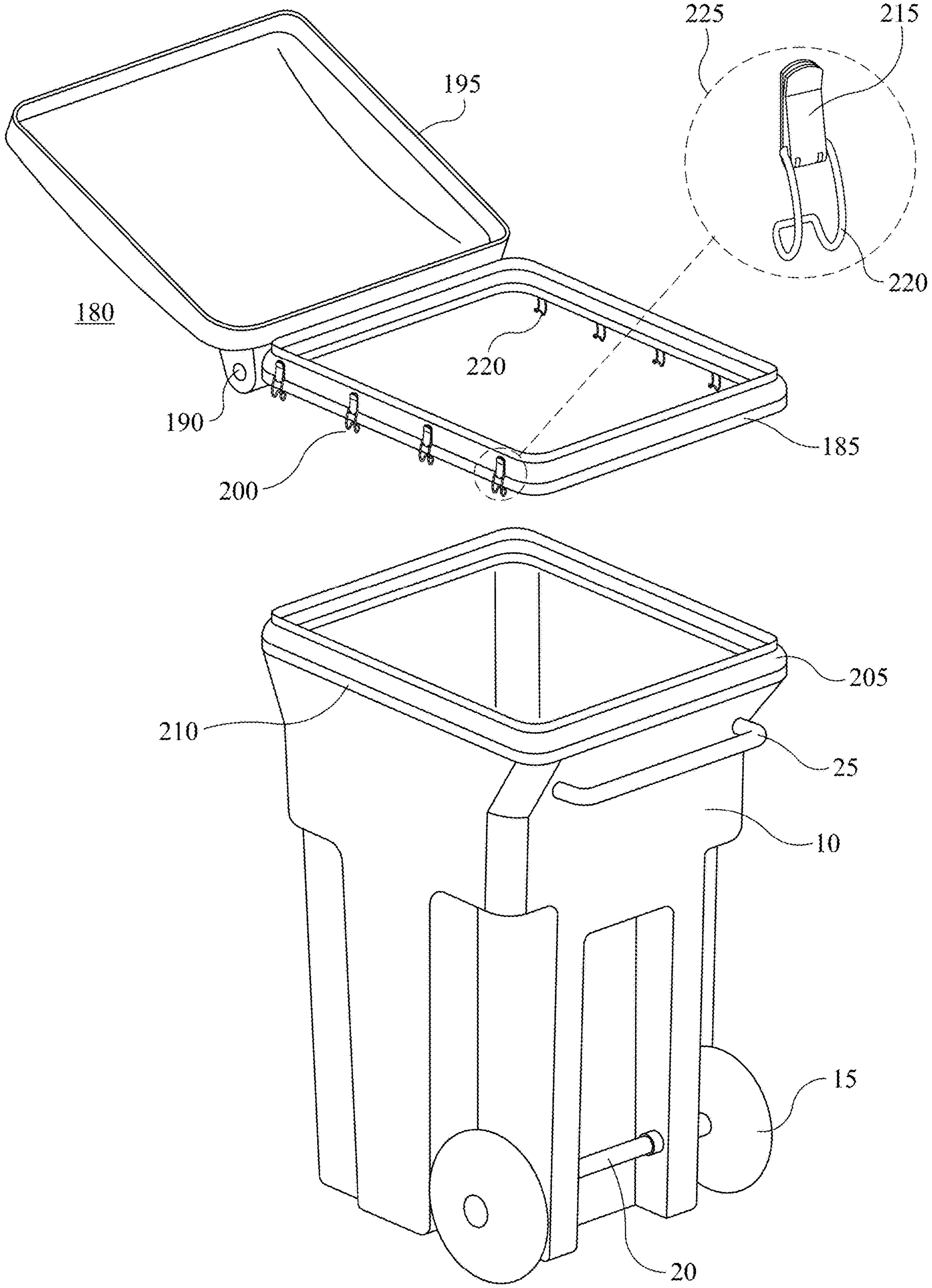
FIG. 24 is a top perspective view of another embodiment of the present invention with a separate prefabricated lid apparatus having a latch fastening means that positions the lid hinge in a vertical plane opposite the wheels and handlebar of the receptacle.
Figure 25:
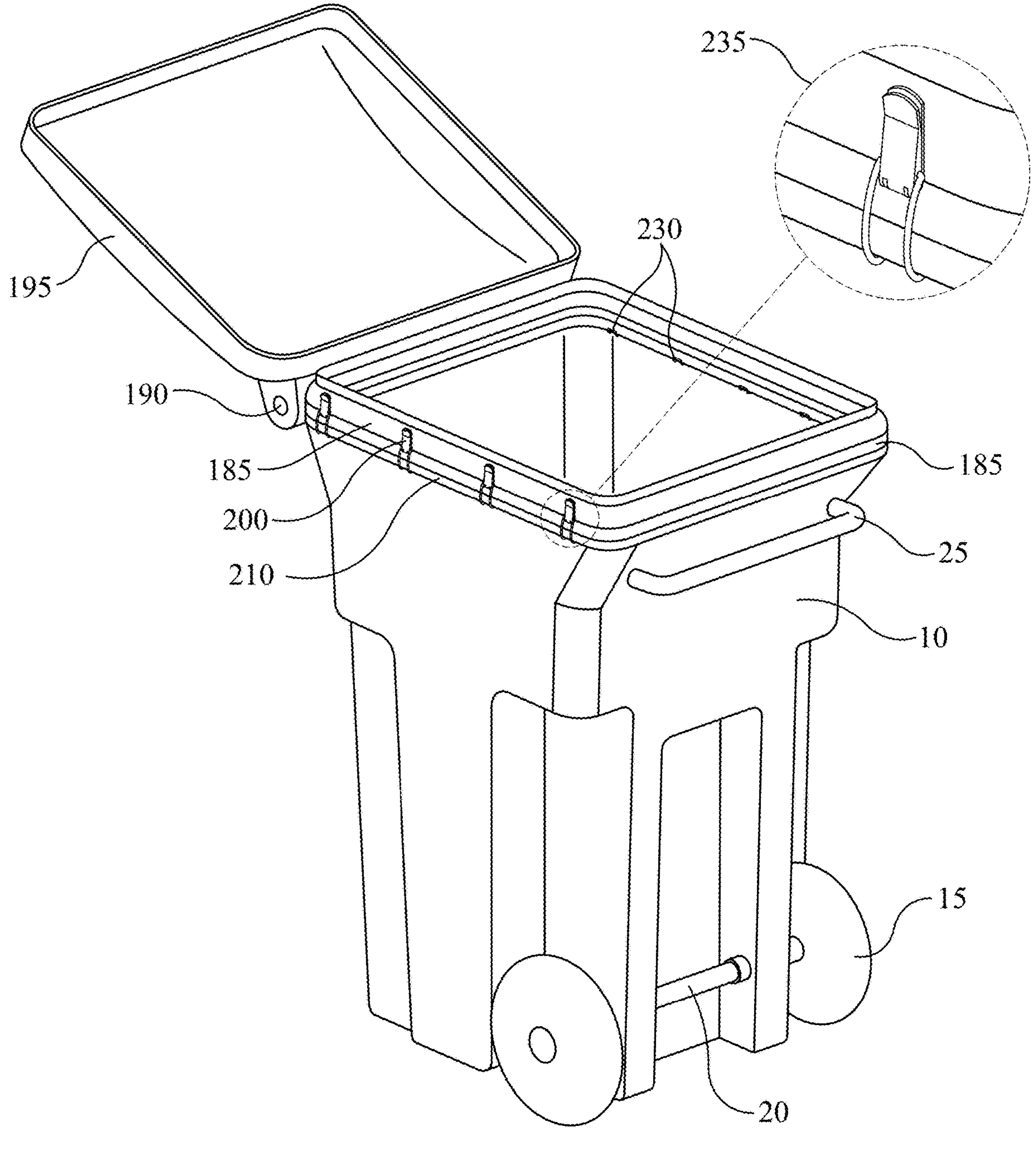
FIG. 25 is a top perspective view of the embodiment of the present invention with a separate prefabricated lid apparatus completely attached to a receptacle by the latch fastening means that positions the lid hinge in a vertical plane opposite the wheels and handlebar of the receptacle.
Figure 27:
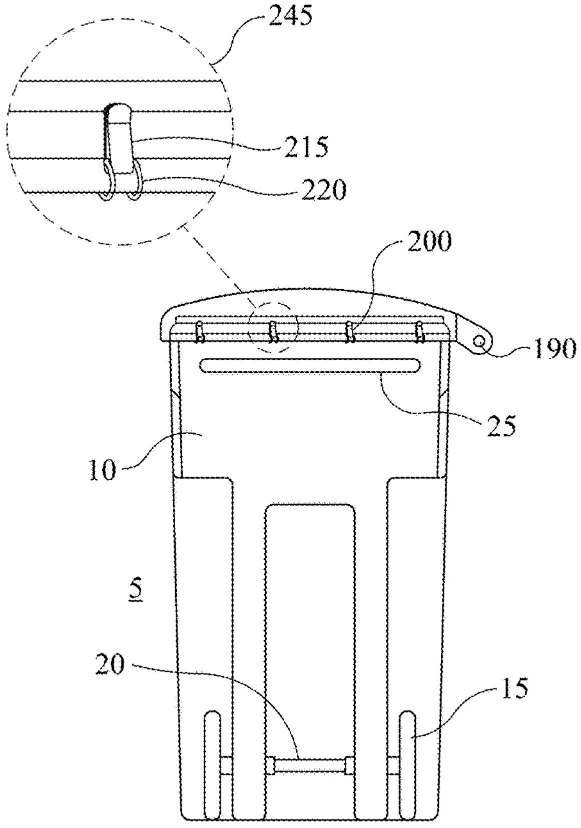
FIG. 27 is a back perspective view of the embodiment of the present invention with a separate prefabricated lid apparatus completely attached to a receptacle by a latch fastening means that positions the lid hinge in a perpendicular plane right adjacent of the wheels and handlebar of the receptacle.

In a seventh embodiment of the present invention, the receptacle 5 comprises customized components, namely a prefabricated lid apparatus 180 as shown in FIG. 24. The lid apparatus 180 is separate from and attachable to the bin 10 portion of the receptacle 5. As shown in FIG. 24, the lid apparatus 180 comprises a lower perimeter portion 185; a hinge 190 that connects the lower perimeter portion 185 to a lid 195; and pre-affixed fastening devices 200 located equidistant from each other along the lower perimeter portion 185 of two parallel opposing sides of the lower perimeter portion 185. As shown in FIG. 24, the bin 10 portion of the receptacle is not customized, however features of the existing bin 10 are being referenced to aid in the description of the invention. The bin 10 includes a top perimeter portion 205 and a vertically adjacent lower edge 210 which creates a skirt around the top perimeter portion 205 of the bin 10. The skirting of the lower edge 210 provides a space between itself 210 and the body of the bin 10. In this embodiment of the present invention, the fastening devices 200 comprise a latching mechanism with a top section 215 that is permanently pre-affixed to the lower perimeter portion 185 of the lid apparatus 180 and a bottom section 220 that extends downward therefrom, as further illustrated in the magnified view 225 of FIG. 24. The measurement of the lower perimeter portion 185 of the lid apparatus 180 is sufficiently larger or slightly larger than the measurement of the top perimeter portion 205 of the bin 10 to ensure a tight fit when the lid apparatus 180 is attached over the top perimeter portion 205 of the bin 10 and the two respective perimeter portions 180, 205 are fastened together to form a customized receptacle 5 as shown in FIGS. 25 and 27. The minimal difference in the measurement of the respective perimeters ensures a tight fit void of any gaps or observable spacing between the lid apparatus 180 and the top perimeter portion 205 of the bin 10. The measurement of this minimal difference is known to one of ordinary skill in the art of making trash and recycling receptacles.

Figure 26:
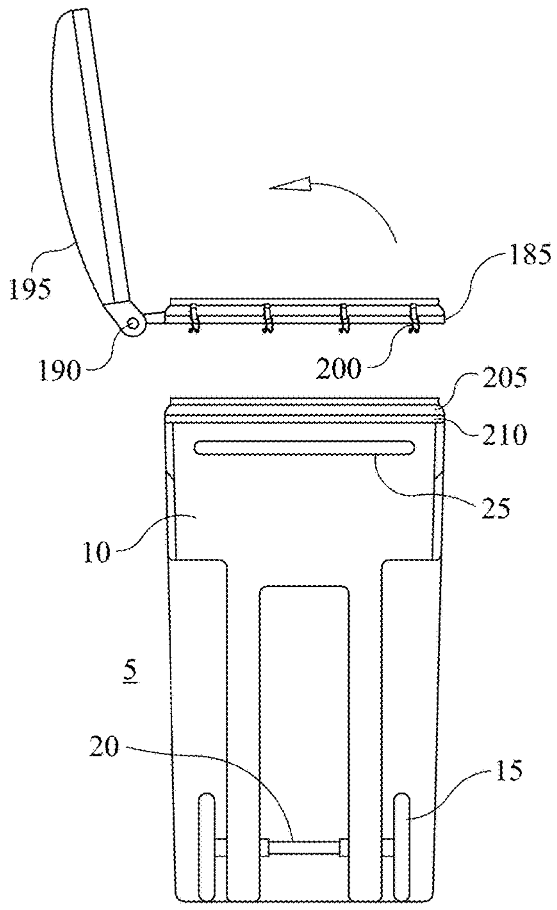
FIG. 26 is a back perspective view of the embodiment of the present invention with a separate prefabricated lid apparatus having a latch fastening means that attaches the lid hinge in a perpendicular plane left adjacent of the wheels and handlebar of the receptacle.

As shown in FIGS. 24 and 26, the lower perimeter portion 185 of the lid apparatus 180 is attached to the top perimeter portion 205 of the bin 10 whereby the latching devices 200 are aligned above the top perimeter portion 205 of the bin 10, as shown in FIG. 26, and the extended section 220 of each latching device 200 is hooked, as illustrated by magnified view 235 in FIG. 25, to the underside 230 of the lower edge 210 of the bin 10 for a secure fit, as also shown in magnified view 245 of FIG. 27. The resulting receptacle 5 is customized whereby the hinge 190 of the lid apparatus 180 is located in a vertical plane that is opposite the vertical plane of the wheels and handlebar 25, which are both located in the same vertical plane of the bin 10, as shown in FIGS. 24 and 25. This allows the lid 195 to be opened from the back to the front (as depicted) of the receptacle 5 without obstruction. Alternatively, as shown in FIG. 26, the hinge 190 of the lid apparatus 180 is attached to the bin 10, and is located perpendicularly left adjacent to the wheels and handlebar 25 which are located in the same vertical plane of the bin 10. This allows the lid 195 to be opened from the right to the left (as depicted) of the receptacle 5 without obstruction. Alternatively, as shown in FIG. 27, the hinge 190 of the lid apparatus 180 is attached to the bin 10, and is located perpendicularly right adjacent to the wheels 15 and handlebar 25 which are located at the rear of the bin 10. This allows the lid 140 to be opened from the left to the right (as depicted) of the receptacle 5 without obstruction. In other configurations, the bin 10 and lid 195 may include a bin magnet and a lid magnet (not depicted) to secure the opened lid 195 to the bin during the garbage and/or recycling removal process, particularly when carried out by a waste collection vehicle. This embodiment of the invention is suitable for use with a side loader or a rear loader waste collection vehicle.

The embodiment of the present invention, as shown in FIGS. 24, 25, 26 and 27, utilizes a conventional receptacle without rearranging or inverting the position of the wheels and handlebar from their original location (i.e., they remain positioned at the rear of the conventional receptacle). Further, the lid portion of a conventional receptacle is removed in order to attach the lid apparatus 180 to the bin 10, and the top perimeter portion 205 of the bin 10 remains unmodified by a user. The pre-affixed fastening devices 200 may be positioned along the front and rear of the lower perimeter portion 185 of the lid apparatus 180 instead of on the sides of the bin 10 (not depicted). Attaching the prefabricated lid apparatus 180 is easy to accomplish and can be done by any residential user.

The embodiments of the invention that include a lid magnet and a bin magnet are best suited for use with rear loaders which require human assistance to empty the trash receptacle, in which case the lid portion of the bin may flap about obstructing the process. The magnets function to hold the lid securely in one place and facilitate easy disposal of trash. All of the embodiments of the present invention may be used with side loaders without obstructing the trash disposal process.

Without being limiting, the first embodiment of the present invention may be best suitable for use with a side loader waste collection vehicle.

Fasteners (pin, c, and latch) may be comprised of various materials including, but not limited to plastic, malleable or soft metals, synthetic fibers, composites, or other suitable material known by one of ordinary skill in the art to which fasteners belong. The lid apparatus may be formed by machine process, 3D printing, molding, or other pre-fabricating process known by one of ordinary skill in the art of pre-fabrication.

As various changes may be made in the above-described subject matter without departing from the scope and the spirit of the invention, it is intended that all subject matter contained in the above description, or shown in the accompanying drawings, will be interpreted as descriptive and illustrative, and not in a limiting sense.

EQUIVALENTS

Those skilled in the art will recognize or be able to ascertain using no more than routine experimentation, many equivalents to the specific embodiments of the invention described herein. Such equivalents are intended to be encompassed by the claims.

What is claimed is:

1. A modified and customizable garbage and recycling receptacle, comprising:

a hollow cuboid bin for depositing garbage or recycling material;

a handlebar located at an upper portion of the bin in a vertical plane; and two wheels located at a bottom portion of the bin, positioned adjacent to each other and are attached to each other by an axle; and the wheels are in a same vertical plane as the handlebar; and a crossbar located between the upper portion and bottom portion of the bin, and the crossbar is in the same vertical plane as the handlebar, axle, and wheels; and a lid attached to the bin by hinges that are located in a vertical plane opposite to the axle, wheels, crossbar, and handlebar, allowing the lid to open away from the axle, wheels, crossbar, and handlebar of the bin; and a first magnet positioned on top of the lid and a second magnet positioned on a side of the bin that is in a same vertical plane as the hinges, whereby the top of the lid is magnetically attached to the bin when completely opened, and the bin remains open until manually closed by a user.

2. The modified and customizable garbage and recycling receptacle of claim 1 wherein the lid is attached to the bin by hinges that are located in a vertical plane that is perpendicularly left adjacent to the vertical plane of the handlebar, allowing the lid to open away from the opposing vertical plane of the bin, whereby the top of the lid is magnetically attached to the side of the bin that is in the same vertical plane as the hinge when completely opened, and the bin remains open until manually closed by the user.

3. The modified and customizable garbage and recycling receptacle of claim 1 wherein the lid is attached to the bin by hinges that are located in a vertical plane that is perpendicularly right adjacent to the vertical plane of the handlebar, the lid to open away from the opposing vertical plane of the bin, whereby the top of the lid is magnetically attached to the side of the bin that is in the same vertical plane as the hinge when completely opened, and the bin remains open until manually closed by the user.

4. A modified and customizable garbage and recycling receptacle, comprising:

a hollow cuboid bin for depositing garbage or recycling material, having a top perimeter portion;

a handlebar located at the top portion of the bin in a vertical plane;

two wheels located at a bottom portion of the bin, the wheels are horizontally adjacent to each other and are attached to each other by an axle; and the wheels are in a same vertical plane as the handlebar;

a crossbar located between an upper portion and bottom portion of the bin in a vertical plane opposite to the handlebar, axle, and wheels; and a prefabricated lid apparatus that is separate from and customized for attachment to the bin, comprising: a lower perimeter portion; a lid; a hinge that connects the lower perimeter portion to the lid; and fastening means pre-affixed along parallel opposing sides of the lower perimeter portion;

the pre-affixed fastening devices attach the lid apparatus to the bin; and the lid apparatus is attached to the bin whereby the hinge is located in a vertical plane opposite to the vertical plane of the wheels and handlebar, allowing the lid to open away from the wheels and handlebar of the bin; and a first magnet positioned on top of the lid and a second magnet positioned on a side of the bin that is in a same vertical plane as the hinges, whereby the top of the lid is magnetically attached to the bin when completely opened, and the bin remains open until manually closed by a user.

5. The modified and customizable garbage and recycling receptacle of claim 4 wherein the lid apparatus is attached to the bin by hinges that are located in a vertical plane that is perpendicularly left adjacent to the vertical plane of the handlebar allowing the lid to open away from the opposing vertical plane of the bin, whereby the top of the lid is magnetically attached to the side of the bin that is in the same vertical plane as the hinge when completely opened, and the bin remains open until manually closed by the user.

6. The modified and customizable garbage and recycling receptacle of claim 4 wherein the lid apparatus is attached to the bin by hinges that are located in a vertical plane that is perpendicularly right adjacent to the vertical plane of the handlebar, allowing the lid to open away from the opposing vertical plane of the bin, whereby the top of the lid is magnetically attached to the side of the bin that is in the same vertical plane as the hinge when completely opened, and the bin remains open until manually closed by the user.

7. A modified and customizable garbage and recycling receptacle, comprising:

a hollow cuboid bin for depositing garbage or recycling material;

a handlebar located at an upper portion of the bin in a vertical plane; and two wheels located at a bottom portion of the bin, positioned adjacent to each other and are attached to each other by an axle; and the wheels are in the same vertical plane as the handlebar; and a crossbar located between the upper portion and bottom portion of the bin in a vertical plane opposite to the handlebar, axle, and wheels; and a lid attached to the bin by hinges that are located in a same vertical plane as the crossbar and the vertical plane opposite to the axle, wheels and handlebar, allowing the lid to open away from the axle, wheels and handlebar of the bin.

8. The modified and customizable garbage and recycling receptacle of claim 7 wherein the lid is attached to the bin by hinges that are located in a vertical plane that is perpendicularly left adjacent to the vertical plane of the handlebar, allowing the lid to open away from the opposing vertical plane of the bin.

9. The modified and customizable garbage and recycling receptacle of claim 7 wherein the lid is attached to the bin by hinges that are located in a vertical plane that is perpendicularly right adjacent to the vertical plane of the handlebar, allowing the lid to open away from the opposing vertical plane of the bin.

* * * * *